ature, doing away with the objection to both when they are used alone, and producing a preservative having advantages not possessed by either of these substances used alone.

UNITED STATES PATENT OFFICE.

GEORGE GRINDROD, OF KENT, WASHINGTON, ASSIGNOR TO CARNATION MILK PRODUCTS CO., OF SEATTLE, WASHINGTON, A CORPORATION OF MAINE.

PRESERVATIVE FOR MILK.

1,393,282.	Specification of Letters Patent.	Patented Oct. 11, 1921.

No Drawing.	Application filed January 7, 1918. Serial No. 210,617.

*To all whom it may concern:*

Be it known that I, GEORGE GRINDROD, a citizen of the United States, and residing in the city of Kent, county of King, and State of Washington, have invented certain novel Preservatives for Milk, of which the following is a specification.

This invention relates to preservatives for milk, and more particularly has for its object to provide an efficient preservative adapted to be used for preserving the samples of fresh milk which are taken from the shipping cans when such milk is received at the condensation or evaporation plants. It is the practice in these plants, when the milk is received from the producers in various quantities, and as these quantities are emptied into a receiving vat, to take a sample from each container, which sample is labeled to correspond to the number of the container. By these samples, a check is maintained upon the quality of the milk received. The samples are taken from day to day and placed in stoppered glass jars, a separate jar or bottle being provided for each producer or shipper. At intervals of about one week, the accumulated samples, each representing the milk received from one producer or shipper during that period of time, are analyzed or tested for butter fat, and the milk is paid for in accordance with these analyses or tests. Thus it will be understood that it is important to preserve the samples in substantially the same condition in which the milk is received.

Heretofore, certain preservatives have been used for the purpose indicated above, but all of them have proved unsatisfactory for some reason or other, and many efforts have been made, so far unsuccessful, to provide an efficient and satisfactory preservative for such samples of milk. The preservatives used hitherto have been unsatisfactory for one or more of the following reasons:

(1) Because they are not sufficiently powerful; (2) because (as in the case of formaldehyde) they were not stable or permanent, or lost their strength after being put in the milk; (3) because (as in the case of bichromates) they interfered with the subsequent testing of the milk if used in quantities large enough to preserve the milk; (4) because (as in the case of mercuric chlorid) they were colorless, and, therefore, it was impossible to ascertain at a glance whether or not the sample had been treated with the preservative; (5) because (as in the case of bichromates) they could not be made into a liquid strong or dense enough to effect only a negligible dilution of the sample.

In order to satisfy all the requirements, a preservative for milk samples ought to be powerful enough to preserve a very large amount of milk, say up to twenty thousand times its own weight; the preservative ought to be entirely stable, both while being held ready for use and while mixed with the sample; it ought to give the milk a readily discernible permanent color; it should not interfere with the analyzing of the sample; and, lastly, it ought to be a liquid containing only a very small and negligible amount of water.

As a result of numerous experiments and extensive research, I have succeeded in producing a novel preservative meeting all the requirements enumerated above, and its superiority over preservatives employed hitherto is particularly marked in this respect that, so far as I am aware, the new preservative is the only one which can be prepared in liquid form of such density as to effect only a negligible dilution of the sample, and which at the same time, when used in such strength will not interfere with the subsequent testing of the milk.

My improved preservative comprises a powerful, stable preservative dye in conjunction with a soluble mercury salt. It has been found that mercuric chlorid when used alone is unsuitable, because it has no color, and, therefore, does not indicate at a glance that the milk in which it is used is poisonous. On the other hand, most dyes are insoluble or unstable in a concentrated solution of a mercury salt. I have found that fuchsin is a very powerful preservative in itself, but is insufficiently soluble except when used in the form of hydrochlorid, that is to say, of an acid salt. The hydrochlorid is yellow, and thus has a less marked color than required when it is used as a preservative, but when added to the milk it becomes disassociated and the full color of fuchsin is restored. Fuchsin has a preserving power approximately the same as that of mercuric chlorid, both being the most powerful preservatives available hitherto. The joint use of fuchsin and mercuric chlorid yields a liquid which can be easily measured and at the same time requires so little water as to cause no appreciable dilution of the milk sample. Thus from two to three drops added to the usual size of milk sample (12 ounces) will effect complete preservation. Neither element of the new preservative has any marked oxidizing power, and, unlike other preservatives, it does not interfere with the subsequent analysis or testing of the milk. Further, both of the elements of the novel preservative or compound separately and mixed are unaffected by enzyms or other constituents of milk, remaining unchanged in the milk and retaining their full preserving power indefinitely, being in this respect superior to formaldehyde or other organic preservatives.

In carrying out the preferred form of my invention, mercuric chlorid $HgCl_2$, is dissolved with sodium or any other alkali metal (K,Am.) chlorid and in this manner I obtain a double chlorid of mercury and of an alkali metal, and if sodium was used this double chlorid will have the formula $HgCl_2,NaCl$. Any one of these double chlorids is soluble in water to such an extent as to produce a solution containing more than one gram of mercuric chlorid ($HgCl_2$) per cubic centimeter. The mercuric chlorid is heated with the sodium chlorid in the presence of a suitable amount of water (say 25%) and then a solution of fuchsin hydrochlorid $C_{20}H_{19}N_3HCl$, sufficient to make one per cent. of fuchsin in the finished product, is acidified with hydrochloric acid (HCl) and is then added to the mercury salt solution, whereupon the whole mass is diluted to the point where one cubic centimeter contains one gram of $HgCl_2$.

Thus, by the mixture or joint use of fuchsin and a mercury chlorid, a compound or substance is produced which is an admirable preservative for milk samples, and which does not affect the subsequent analysis of the milk; at the same time this substance preserves the milk, and by coloring the sample gives warning of the fact that the sample has been treated with a poisonous substance.

While I have described a preferred form of my invention, it is obvious that changes may be made therein, within the spirit and scope thereof, as defined in the appended claims.

I claim:

1. A milk preservative solution consisting of a hydrochloric acid salt of fuchsin with an excess of hydrochloric acid, and a double chlorid of mercury and an alkali metal, in liquid state, said solution containing approximately one per cent. (1%) of fuchsin.

2. A milk preservative, consisting of a solution of a hydrochloric acid salt of fuchsin with an excess of hydrochloric acid, and a double chlorid of mercury and an alkali metal, said solution having approximately one per cent. (1%) of fuchsin, containing approximately one gram of mercuric chlorid per cubic centimeter.

3. A process of making a milk preservative which consists in heating a mercuric chlorid with sodium chlorid and the desired amount of water, then adding a solution of fuchsin hydrochlorid acidified with hydrochloric acid, sufficient to make approximately one per cent. of fuchsin in the finished product, and then diluting the mixture to the point where one cubic centimeter contains one gram of mercuric chlorid.

4. A process of making a milk preservative, which consists in treating mercuric chlorid with a chlorid of alkali metal in the presence of water, then adding a solution of an acid salt of fuchsin having an excess of hydrochloric acid, and then diluting the mixture until one cubic centimeter of the final product contains approximately one gram of mercuric chlorid.

5. A process of making a milk preservative, which consists in treating mercuric chlorid with a chlorid of an alkali metal in the presence of water, then adding an amount of a solution of fuchsin hydrochlorid, acidified with hydrochloric acid, sufficient to make approximately one per cent. of fuchsin in the finished product, and then diluting the mixture to the point where one cubic centimeter contains one gram of mercuric chlorid.

In testimony that I claim the foregoing as my invention, I have signed my name in the presence of two subscribing witnesses.

GEORGE GRINDROD.

Witnesses:
A. Y. COUGAN,
H. N. STUART.